US010087316B2

(12) United States Patent
Collias et al.

(10) Patent No.: US 10,087,316 B2
(45) Date of Patent: Oct. 2, 2018

(54) POLYMERIC COMPOSITIONS AND ARTICLES COMPRISING POLYLACTIC ACID AND POLYOLEFIN

(75) Inventors: Dimitris Ioannis Collias, Mason, OH (US); Norman Scott Broyles, Hamilton, OH (US); John Andrew McDaniel, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 991 days.

(21) Appl. No.: 12/111,426

(22) Filed: Apr. 29, 2008

(65) Prior Publication Data

US 2009/0269527 A1    Oct. 29, 2009

(51) Int. Cl.
C08L 57/00 (2006.01)
C08L 23/06 (2006.01)
C08L 23/08 (2006.01)
C08L 67/04 (2006.01)

(52) U.S. Cl.
CPC ........... *C08L 23/06* (2013.01); *C08L 23/0869* (2013.01); *C08L 67/04* (2013.01); *C08L 2205/03* (2013.01); *Y10T 428/1352* (2015.01)

(58) Field of Classification Search
USPC .................. 428/35.7; 524/108, 310, 317
See application file for complete search history.

(56) References Cited

U.S. PATENT DOCUMENTS

| | | | |
|---|---|---|---|
| 5,216,050 A * | 6/1993 | Sinclair | .......... 524/108 |
| 6,110,849 A | 8/2000 | Tsai | |
| 6,479,001 B1 | 11/2002 | Tsai | |
| 7,354,973 B2 | 4/2008 | Flexman | |
| 7,381,772 B2 | 6/2008 | Flexman | |
| 7,595,363 B2 | 9/2009 | Uradnisheck et al. | |
| 8,083,064 B2 | 12/2011 | Boswell et al. | |
| 8,367,173 B2 | 2/2013 | Wnuk et al. | |
| 9,309,031 B2 | 4/2016 | Meadows et al. | |
| 2005/0137303 A1 * | 6/2005 | Shelby et al. | .......... 524/284 |
| 2005/0183329 A1 | 8/2005 | Cederbland | |
| 2007/0173603 A1 | 7/2007 | Murakami | |
| 2008/0027178 A1 | 1/2008 | Uradnisheck | |
| 2008/0071018 A1 | 3/2008 | Smillie | |
| 2008/0280117 A1 * | 11/2008 | Knoll et al. | ............ 428/216 |
| 2009/0012194 A1 | 1/2009 | Okuda | |
| 2009/0023861 A1 | 1/2009 | Shimakage | |
| 2009/0171037 A1 | 7/2009 | Aoshima et al. | |
| 2009/0264591 A1 | 10/2009 | Sano | |
| 2010/0016495 A1 | 1/2010 | Taniguchi | |
| 2010/0028512 A1 | 2/2010 | Kriegel et al. | |
| 2011/0057355 A1 | 3/2011 | Meadows et al. | |
| 2016/0188352 A1 | 6/2016 | Marathe et al. | |

FOREIGN PATENT DOCUMENTS

| | | |
|---|---|---|
| EP | 1679347 A1 | 7/2006 |
| JP | 2001031762 A2 | 2/2001 |
| JP | 2002194154 A2 | 7/2002 |
| JP | 2005320409 A2 | 11/2005 |
| JP | 2006-077063 A | 3/2006 |
| JP | 2006076576 A2 | 3/2006 |
| JP | 2006321988 A2 | 11/2006 |
| JP | 2006348060 A2 | 12/2006 |
| JP | 2007009008 A2 | 1/2007 |
| JP | 2007-308638 A | 11/2007 |
| JP | 2008-038142 | 9/2009 |

OTHER PUBLICATIONS http://www.biotaspringwater.com/bottle FAQ's, 3 pages printed Feb. 22, 2007.
PCT International Search Report and Written Opinion for PCT/US2009/041762 dated Jul. 23, 2009, 12 pages.
All final and non-final office actions for U.S. Appl. No. 12/876,764.
All final and non-final office actions for U.S. Appl. No. 12/876,791.
All final and non-final office actions for U.S. Appl. No. 13/013,302.
All final and non-final office actions for U.S. Appl. No. 13/287,338.
All final and non-final office actions for U.S. Appl. No. 15/053,381.

* cited by examiner

*Primary Examiner* — Ellen S Wood
(74) *Attorney, Agent, or Firm* — Alexandra S. Anoff

(57) ABSTRACT

The present invention relates to polymeric compositions comprising polylactic acid (PLA), polyolefin, and, optionally, a non reactive melt strength enhancing additive (NRM-SEA), as well as articles molded from the compositions and a method of making the compositions.

5 Claims, No Drawings

POLYMERIC COMPOSITIONS AND ARTICLES COMPRISING POLYLACTIC ACID AND POLYOLEFIN

FIELD OF THE INVENTION

The present invention relates to polymeric compositions comprising polylactic acid (PLA), polyolefin, and, optionally, a non reactive melt strength enhancing additive (NRMSEA), as well as articles molded from the compositions and a method of making the compositions.

BACKGROUND OF THE INVENTION

Polyolefins currently find widespread use in many applications, from packaging to functional products, such as medical devices and disposable consumer products. They are safe, lightweight, and relatively inexpensive. Polyolefins are relatively easy to melt process into their final form via various forming operations, and they are also readily recycled due to their good thermal stability and inert characteristics. Because of these many characteristics, they are ubiquitous in modern society.

Commercially available polyolefins are currently derived from petroleum and/or natural gas, which are finite natural resources. Due to the finite nature of polyolefin feedstocks, the cost of polyolefin is linked to the price volatility of crude oil and natural gas. Economic, social, environmental, and political pressures to reduce dependence on finite resources, such as petroleum and natural gas, and to replace them with materials derived from renewable feedstocks have grown recently. Optimally, such renewable materials would have processability and performance characteristics, as well as cost structure, similar to those of traditional polyolefins. It is also desirable that such renewable materials retain the recylability of traditional polyolefins and do not significantly alter the recycling infrastructure in place today for high-density polyethylene (HDPE)

An example of a renewable thermoplastic material is polylactic acid (PLA), which is an aliphatic polyester derived from renewable agricultural products. PLA has been used in a number of applications, such as water bottles and packaging clamshells for fresh produce, to wholly replace polyolefin or polyethylene terephthalate (PET). PLA, however, is not in widespread use due to its limited processability (i.e., poor melt strength, which does not allow it to be extrusion-blow-molded into bottles), limited recyclability (i.e., lack of a dedicated recycling stream, potential to contaminate the PET recycling stream, as described below), and other disadvantageous properties of the material (i.e., low heat deflection temperature, poor water barrier, poor resistance to solvents and surfactants encountered in non-food packaging applications).

There have been efforts to modify some of the properties of PLA (i.e., poor melt strength) by adding other components to PLA, at minor concentrations (less than about 50 wt %). For example, polyolefins and their copolymers have been added to PLA at concentrations less than about 50 wt % to improve the impact properties of PLA. The processing of such PLA and polyolefin mixtures, though, unlike the processing of polyolefins, such as HDPE, requires additional pre-processing steps and the use of twin screw extruders as well as reactive melt strength enhancing additives (RMSEA), in order to achieve adequate dispersion of the minor polyolefin phase in the continuous PLA phase. Pre-processing requires that PLA pellets and polyolefin pellets are melted, mixed, cooled, solidified, and cut into PLA/polyolefin pellets, which are then fed into a twin screw extruder. The use of a twin screw extruder and/or a RMSEA adds significant cost and complexity to the manufacturing process. In extrusion blow molding, molders typically incorporate single screw extruders, not twin screw extruders. With regard to the RMSEA, the use of these additives requires monitoring and greater control of the manufacturing process. The use of a RMSEA may also require a purification step, to remove unreacted reactants, and it may produce volatile products, which necessitates the use of a twin screw extruder to vent such volatile products. Thus, the previously taught mixtures of PLA and polyolefin could not simply be substituted for a polyolefin, such as HDPE, and processed on a traditional polyolefin processing platform (i.e., a traditional extrusion blow molding platform), using a single screw extruder and without pre-processing or the use of a RMSEA.

Additionally, products made from such PLA and polyolefin mixtures are not currently recyclable, due to difficulties in separating such products from the primary PET recycling stream. There are two primary streams of plastic recycling, the HDPE stream and the PET stream (PET is a clear plastic and contamination with HDPE compromises its clarity, i.e., PET becomes hazy). Water-based separation systems are used to separate the two plastics by density, prior to recycling. The density of PET is greater than 1 $g/cm^3$, the density of water, and it sinks in water-based separation systems. The density of HDPE is less than 1 $g/cm^3$ and it floats in water-based separation systems. Containers made from a blend of HDPE and PLA, where PLA is present at a concentration of approximately 30% or greater, have a density greater than 1 $g/cm^3$. Such containers sink in a water-based separation system, thereby contaminating the PET stream.

Therefore, there still exists a need for polymeric compositions that, in terms of processability, performance, recyclability, and cost, are similar to polyolefins but contain renewable polymers.

SUMMARY OF ILLUSTRATIVE EMBODIMENTS

The present invention is directed to compositions for manufacturing articles containing renewable materials, particularly polymeric compositions for molding into such articles. The compositions comprise PLA, in a concentration greater than about 0.1 wt % and less than about 15 wt %, a polyolefin, and, optionally, a NRMSEA. Depending upon the concentration of PLA in a composition, an NRMSEA may or may not be included.

Methods of making articles comprising PLA, in a concentration greater than about 0.1 wt % and less than about 15 wt %, a polyolefin, and, optionally, a NRMSEA are also provided. Depending upon the concentration of PLA, an NRMSEA may or may not be included.

DETAILED DESCRIPTION OF ILLUSTRATIVE AND PREFERRED EMBODIMENTS

While the specification concludes with claims that particularly point out and distinctly claim the invention, it is believed the present invention will be better understood from the following description.

The present invention relates to a polymeric composition comprising a mixture of PLA, a polyolefin, and, optionally, a NRMSEA.

As used herein, the term "renewable" is meant to refer to a natural resource that is replenished by natural processes at a rate comparable to its rate of consumption by users. Natural resources that qualify as renewable resources include oxygen, fresh water, timber, and plants.

All percentages, parts, and ratios are based upon the total weight of the compositions of the present invention, unless otherwise specified. All such weights as they pertain to listed ingredients are based on the active level and, therefore, do not include solvents, catalysts, residual monomers, contaminants, or by-products that may be included in commercially available materials, unless otherwise specified. The term "weight percent" may be denoted as "wt %" herein.

Except as otherwise noted, all amounts including parts, percentages, and proportions are understood to be modified by the word "about", and amounts are not intended to indicate significant digits. Except as otherwise noted, the articles "a", "an", and "the" mean "one or more".

I. Polylactic Acid

The polymeric compositions described herein comprise polylactic acid (PLA). Generally, PLA is a homopolymer or a copolymer, which is derived from renewable starch-rich substances, such as corn, sugar cane, wheat, and rice. Bacterial fermentation is used to produce lactic acid from such starch-rich sources. PLA is typically prepared by the polymerization of lactic acid. It will be recognized by one skilled in the art, however, that a chemically equivalent material may be prepared by the polymerization of lactide, a derivative of lactic acid. As such, as used herein, the term "PLA" is intended to represent the polymer that is prepared by either the polymerization of lactic acid or lactide.

Examples of PLA polymers that are suitable for use in the present invention include a variety of PLA polymers that are available from NatureWorks LLC, Minnetonka, Minn.

It is generally desired that the PLA be melt processable. It is therefore desired that the PLA exhibit a melt flow rate, at about 210° C., that is preferably between about 0.1 g/10 min to about 1000 g/10 min, preferably between about 1 g/10 min to about 200 g/10 min, and more preferably between about 5 g/10 min to about 50 g/10 min. The melt flow rate of a material may be determined according to ASTM Test Method D1238-E, incorporated in its entirety herein by reference.

It is generally desired that the PLA be present in the polymeric composition in an amount effective to result in the composition exhibiting desired processing, mechanical, and recycling properties. If the PLA is present in the polymeric composition in too great of a concentration, the composition will generally exhibit poor processing (i.e., melt strength) and poor recycling properties.

In certain embodiments, PLA is present in the polymeric composition in a concentration of about 0.1 wt % to 10 wt %, more preferably between about 1 wt % and about 8 wt %, preferably between about 2 wt % and about 6 wt %, and more preferably about 5 wt %, wherein all weight percents are based on the total weight amount of the polyolefin, PLA, optionally, a NRMSEA, and optional additives present in the composition.

In some embodiments, PLA is present in the polymeric composition in a concentration of about 10 wt % to about 15 wt %, preferably between about 11 wt % and about 14 wt %, preferably about 13 wt %. Typically, when the PLA is present in the polymeric composition in a concentration of greater than about 10 wt %, the composition further contains a NRMSEA. NRMSEA may or may not be present when the PLA concentration is less than 10 wt %.

II. Polyolefin

Generally, any polyolefin capable of being fabricated into an article is suitable for use herein. The term polyolefin refers to a homopolymer of an olefin or a copolymer of an olefin and another comonomer, which may or may not be an olefin. Polyolefins include, but are not limited to, linear or branched poly α-olefins and cyclic polyolefins. Non-limiting examples of linear poly α-olefins include high density polyethylene (HDPE) and polypropylene (PP). A non-limiting example of a branched poly α-olefin homopolymer is low density polyethylene (LDPE). A non-limiting example of a branched poly α-olefin copolymer is linear low density polyethylene (LLDPE). Non-limiting examples of polyethylene copolymers include poly(ethylene-vinyl acetate), poly (ethylene-maleic anhydride), and poly(ethylene-vinyl alcohol).

HDPE is generally a homopolymer of ethylene or a copolymer of ethylene and another α-olefin, with a final solid state polymer density of between about 0.945 g/cm$^3$ and 0.968 g/cm$^3$. PP is generally a homopolymer of propylene or a copolymer of propylene with a comonomer, where the content of propylene is greater than about 75 mol %.

In some embodiments, the polyolefin is a homopolymer or a copolymer selected from the group consisting of HDPE, LDPE, LLDPE, and mixtures thereof. In further embodiments, the polyolefin is a HDPE homopolymer or copolymer. Suitable HDPE polymers are known and may be obtained, for example, from INEOS Olefins & Polymers USA of League City, Tex., under the designation B54-25H-127 polyethylene copolymer, or from ExxonMobil Corp. of Irving, Tex., under the designation Paxon™ AA60-003.

It is generally desired that the polyolefin be present in the polymeric composition in an amount effective to result in the composition exhibiting desired properties. If the polyolefin is present in the polymeric composition at too low of a concentration, the composition will generally exhibit poor extrusion processability properties, i.e., exhibiting low melt strength, extrudate roughness, sticking to the die or mold. Also, if the polyolefin is present in the polymeric composition at too low of a concentration, a container produced from the composition via a forming operation, such as extrusion blow molding, may have a poor appearance and poor mechanical properties.

In certain embodiments, the polyolefin polymer is present in the polymeric composition in a concentration of about 80 wt % to about 99.9 wt %, more preferably between about 85 wt % and about 98 wt %, and preferably between about 90 wt % and about 95 wt %, where all weight percents are based on the total weight amount of the polyolefin, PLA, optionally, a NRMSEA, and any optional additives present in the polymeric composition.

III. Non Reactive Melt Strength Enhancing Additive

In certain embodiments, the polymeric compositions described herein comprise a non reactive melt strength enhancing additive (NRMSEA). As used herein, a NRMSEA is defined as an additive that improves the melt strength of the composition, for example, such that the composition can be blow molded into a container using typical extrusion blow molding equipment. The NRMSEA may also improve the surface finish of the molten product, which ultimately results in an improved surface quality of the blow molded part. In contrast to a RMSEA, a NRMSEA generally does not form permanent covalent bonds with the other components of the composition.

The non-reactive nature of the NRMSEA is believed to contribute to the processability and recyclability of the resultant polymeric composition. The NRMSEA may improve the processability of a polymeric composition containing PLA and a polyolefin, especially when PLA is present at a concentration of greater than about 10 wt % or when a complex container is produced from the polymeric composition. The complexity of a container relates to the geometry of the container. For example, a simple container will be symmetrical with large radii of curvature and few sharp angles. A complex container will be asymmetrical, such as an oval, with numerous sharp corners. Also, in some cases, the design of the die exiting the single screw extruder, which is used in the extrusion blow molding process, may suggest the addition of a NRMSEA, to improve the processability of the polymeric composition. The inclusion of colorants or other additives may also suggest the addition of a NRMSEA.

In some embodiments, the NRMSEA is an ethylene copolymer of ethylene, $CH_2=C(R^1)CO_2R^2$, and $CH_2=C(R^3)CO_2R^4$, where $R^1$ is hydrogen or an alkyl with 1-8 carbon atoms, $R^2$ is an alkyl with 1-8 carbon atoms, $R^3$ is hydrogen or an alkyl with 1-6 carbon atoms, and $R^4$ is glycidyl. In certain embodiments, the NRMSEA is an ethylene copolymer of ethylene, butyl acrylate, and glycidyl methacrylate, or a blend of an ethylene copolymer and an ionomer, or an ethylene copolymer of ethylene and acrylate ester or vinyl acetate, or an acrylic copolymer of methyl methacrylate, butyl acrylate, butyl methacrylate, and, optionally, styrene. Examples of NRMSEAs that are suitable include ethylene copolymers available from E. I. DuPont De Nemours and Company, Wilmington, Del., under the trade names Biomax® Strong 100 and Biomax® Strong 120, and acrylic copolymers from Arkema Inc., Philadelphia, Pa., under the trade names Biostrength™ 130, Biostrength™ 150, and Biostrength™ 700.

It is generally desired that the NRMSEA be present in the polymeric composition in an amount effective to result in the composition exhibiting desired properties, i.e., surface finish of the molten product and melt strength. The NRMSEA is generally present in the polymeric composition in a weight ratio of about 1:1 to about 1:25 with PLA, more preferably in a weight ratio of about 1:8 to about 1:12, and preferably in a weight ratio of about 1:10.

IV. Optional Components

While the principal components of the polymeric composition have been described in the foregoing, such composition is not limited thereto and may include other components not adversely affecting the desired properties of the composition. Exemplary materials which could be used as additional components include, without limitation, pigments, antioxidants, stabilizers, surfactants, waxes, flow promoters, solid solvents, plasticizers, nucleating agents, physical and chemical blowing agents, particulates, starch, and materials added to enhance the processability of the polymeric composition. If such additional components are included in a polymeric composition, it is generally desired that such additional components be used in an amount that is preferably less than about 5 wt %, more preferably less than about 3 wt %, and preferably less than about 1 wt %, wherein all weight percents are based on the total weight amount of the polyolefin, PLA, optionally, a NRMSEA, and any such optional additives present in the polymeric composition.

V. Methods of Making the Polymeric Composition

In general, the steps for processing the polymeric compositions of the invention are largely the same as the steps, well known in the art, for processing polyolefins, such as HDPE. The equipment used, i.e., extrusion blow molder, die, and mold, as well as the processing conditions, i.e., time, pressure, temperature, are also the same as the equipment and processing conditions employed in conventional polyolefin processing.

As an initial step, the polymers, PLA and polyolefin, optionally, the NRMSEA, and any other optional components may be physically blended together (in any order), each component being present in pellet or powder form, to form a polymeric composition dry mixture. In some embodiments, the composition dry mixture may then be agitated, stirred, or otherwise blended at about room temperature, to mix the components such that an essentially macroscopically homogeneous mixture is formed. As used herein, the term "microscopically homogeneous" refers to a mixture that is homogeneous on the size scale of 10 to 50 μm, as determined by electron microscopy. As used herein, the term "macroscopically homogeneous" refers to a mixture that is homogeneous on the size scale of approximately 1000 polymer pellets or powder particles, but inhomogeneous on the size scale of a few pellets or powder particles. The mixture may then be melt blended in, for example, a single screw extruder to distribute and disperse the components, such that a substantially microscopically homogeneous melted mixture is formed. The substantially microscopically homogeneous melted mixture may then, optionally, be separately cooled, i.e., in a water quench tank.

More typically, though, the substantially microscopically homogeneous melted mixture is conveyed directly through a die to the molding equipment, using the pressure developed by the single screw mixing equipment, i.e., extrusion blow molding equipment, where the mixture is molded and cooled. It is generally desired that the melting or softening temperature of the polymeric composition be within a range that is typically encountered in most process applications.

Other methods of mixing, melting, and molding the components of the thermoplastic mixture are also possible and will be easily recognized by one skilled in the art. For example, when a NRMSEA is included in the polymeric composition, the polyolefin and PLA polymers may first be dry and melt mixed together and then the NRMSEA may be added to the melted polyolefin/PLA mixture (and the NRMSEA/polyolefin/PLA mixture may then be melt mixed). Alternatively, the polyolefin or PLA and the NRMSEA may first be dry and melt mixed together and then the remaining polymer (polyolefin or PLA) may be added to the melted polymer/NRMSEA mixture (and the NRMSEA/polyolefin/PLA mixture may then be melt mixed). Typically, when an NRMSEA is included in the polymeric composition dry mixture, all three components of the mixture, polyolefin, PLA, and NRMSEA, are dry and melt mixed together. Other methods of mixing together the components of the present invention are also possible and will be easily recognized by one skilled in the art.

It is desirable that the polyolefin and PLA polymers, and, optionally, a NRMSEA remain substantially unreacted with each other in the mixture, such that a copolymer comprising any of the various components is not formed. Analytical techniques, such as nuclear magnetic resonance and infrared analysis, may be used to evaluate the chemical characteristics of the final polymeric mixture, in order to determine if the various components are essentially unreacted.

With respect to molding, the components of the polymeric dry mixture, polyolefin and PLA, and, optionally, NRMSEA, are molded in a single screw extruder. More complex molding equipment, such as a twin screw extruder, may be used, but is not necessary in order to produce a polymeric composition with the desired properties and performance. Pre-processing of the polymeric composition, i.e., pre-melting certain components, is also not required. Generally, the polymeric composition exhibits improved processability properties as compared to, in particular, a polymeric composition comprising greater than about 15 wt % PLA.

VI. Articles Made from Polymeric Compositions

The polymeric compositions described herein may be molded into various articles, including products and product packaging, i.e., a container. Depending on the product or package, the composition may be extrusion blow molded or injection molded. Typically, the compositions described herein are used in an extrusion blow molding process. The polymeric composition of the present invention is suited for producing articles, such as personal care products, household cleaning products, and laundry detergent products, and packaging for such articles. Personal care products include cosmetics, hair care, skin care, and oral care products, i.e., shampoo, soap, tooth paste. Accordingly, in other aspects, the present invention relates to product packaging, such as containers or bottles comprising the polymeric composition described herein. As used herein, the term "container" refers to one or more elements of a container, i.e., body, cap, nozzle, handle, or a container in its entirety, i.e., body and cap. When used in a container, it is generally desired that the polymeric composition exhibit suitable mechanical properties.

The products may include a container, made from the polymeric composition, and an indicia associated with the container, which educates a potential buyer about the container, namely that the container contains a renewable material. Such indicia associated with the container include a label, an insert, a page in a magazine or newspaper, a sticker, a coupon, a flyer, an in-aisle or end-of-aisle display, and point-of-sale items intended to either be taken by prospective buyers or remain in an area proximate the product.

Products made from the polymeric compositions described herein are recyclable in the existing polyolefin recycling infrastructure.

VII. Testing Methods

The following procedures were used to evaluate the compositions and containers of the invention. The drop impact testing method is used to test the mechanical performance of a container. The recycling simulation method is used in evaluating the mechanical performance of post-recycled containers of the invention.

Drop Impact Testing:

A container is filled (to approximately 0.5 inches from the top of the container) with ambient temperature tap water and then capped. A container is placed on the platform of a L.A.B. impact testing device (manufactured by the Columbus McKinnon Corporation, Amherst, N.Y.), at an initial drop height of approximately 1 foot. The L.A.B. equipment release arm is then activated, which drops the container onto the controlled surface of the L.A.B. equipment. If the container survives the impact (no leaks), then the height of the L.A.B. equipment is increased in 1-foot increments, up to 7 feet. The same container is dropped, until the container fails to survive impact or until a drop height of 7 feet is achieved (i.e., the container survives impact at a drop height of 7 feet). The drop height is recorded as the maximum height (up to 7 feet) at which the container survives the drop impact. This test is then repeated at least twice according to the following procedure: the L.A.B. equipment is set to the drop height of the previously tested container minus 2 feet (if the previously tested container does not achieve a drop height of two feet or more, the L.A.B. equipment is set to a height of zero). After three or more containers are tested according to the above procedure, an average drop height is computed.

The above-described test may be performed with the container in a horizontal or vertical orientation. In the horizontal orientation, the container is placed on its side on the platform of the L.A.B. equipment, while in the vertical orientation, the container is stood upright on the platform of the equipment.

Table 1 summarizes the mechanical performances (in accordance with the drop impact test described above) and the processabilities of several different bottles. The bottles are extrusion blow molded (according to methods described in examples 1-1h) and contain varying amounts of PLA and a NRMSEA, BioMax® Strong 100 (some bottles contain no PLA or NRMSEA). Extrudate and bottle quality is rated qualitatively as good, moderate, poor, very poor, or unacceptable. Good extrudate and bottle quality is characterized by uniform wall thickness and the absence of roughness on the inner and outer surfaces of the extrudate (parison) and bottle. Moderate extrudate and bottle quality is characterized by uniform wall thickness but some rough surfaces, especially on the inside of the bottle. Poor extrudate and bottle quality is characterized by areas of non-uniform wall thickness and more widespread surface roughness. Very poor extrudate and bottle quality is characterized by chunking in the extrudate melt, gross areas of non-uniform wall thickness, and widespread surface roughness. Finally, unacceptable extrudate and bottle quality is characterized by low melt strength in the extrudate and holes in bottles. Generally, defects in the extrudate are magnified in the resultant bottle.

TABLE 1

| Example | wt % PLA; wt % NRMSEA | Melt Strength (Qualitative) | Extrudate and Bottle Quality | Vertical Drop Height (ft) | Horizontal Drop Height (ft) |
| --- | --- | --- | --- | --- | --- |
| 1 (Comparative) | 0; 0 | High | Good | 7 | 7 |
| 1a | 5; 0 | High | Good | 7 | 7 |
| 1b | 5; 0.6 | High | Good | 7 | 7 |
| 1c | 10; 0 | Low | Poor | 4 | 6 |
| 1d | 10; 1.2 | High | Good | 5 | 6 |
| 1e | 15; 0 | Very Low | Very Poor | 4 | 6 |
| 1f | 15; 1.6 | Moderate | Moderate | 5 | 7 |
| 1g | 20; 0 | Unacceptable | Unacceptable | not applicable | not applicable |
| 1h | 20; 2.2 | Very Low | Unacceptable | not applicable | not applicable |

The processability and performance of the bottles of examples 1a and 1b are comparable to the processability and performance of the bottles of comparative example 1. The processability and performance of the bottles of example 1c are decreased as compared to examples 1, 1a, and 1b. The processability of the bottles of example 1d is similar to the processability of the bottles of examples 1, 1a, and 1b and improved over the bottles of example 1c. The mechanical performance of the bottles of example 1d is also improved over the bottles of example 1c. With regard to example 1e, blowouts (tearing of the parison) are common and almost 75% of the bottles produced have holes. The processability and performance of the bottles of example 1e are decreased as compared to example 1c. With regard to example 1f, the processability and mechanical performance of the bottles is significantly improved over the bottles of example 1e; less than 10% of the bottles have holes. Regarding example 1g, blowouts are predominant and all the bottles produced have holes (no drop test is performed). The processability of the bottles of example 1g is decreased in comparison to all the other examples. The bottles of example 1h have improved processability as compared to the bottles of example 1g. Extrudate and bottle quality, however, is still unacceptable, as in example 1g (no drop test is performed).

Recycling Simulation:

To simulate a recycling process, containers are granulated using a granulator (Model TFG1624.50 from Granutec, East Douglas, Mass.). The granulated material is washed in a 1 wt % NaOH aqueous solution containing 0.1 wt % Triton-X surfactant at 85° C. for a period of 30 minutes. The washed granules are then rinsed with cool water and placed in a constant temperature and humidity room (90° F. and 60% RH) for a period of seven days. The granules are then dried at 180° F. for 1 day.

The granules produced by this simulated-recycling method are then used to produce post-recycled containers, according to methods described in examples 2'-2d'. And, the post-recycled containers are then subjected to the drop impact testing described above.

Table 2 summarizes the mechanical performances (in accordance with the drop impact test described above) and the processabilities of several different post-recycled bottles (2a'-2d'), as compared to analogous bottles made from virgin materials (2a-2d).

The bottles are extrusion blow molded and contain varying amounts of PLA and a NRMSEA, BioMax® Strong 100 (some bottles contain no PLA or NRMSEA). Extrudate and bottle quality is rated qualitatively as described above.

TABLE 2

| Example | wt % PLA; wt % NRMSEA | Density < 1.0 g/cm³ Yes or No? | Extrudate and Bottle Quality | Vertical/ Horizontal Drop Height (ft) |
|---|---|---|---|---|
| 2 (Comparative) | 0; 0 | Yes | Good | 7/7 |
| 2' (Comparative) | 0; 0 | Yes | Good | 7/7 |
| 2a | 10; 0 | Yes | Moderate | 4/6 |
| 2a' | 10; 0 | Yes | Moderate | 4/7 |
| 2b | 10; 1.2 | Yes | Good | 5/6 |
| 2b' | 10; 1.2 | Yes | Good | 7/7 |
| 2c | 15; 0 | Yes | Poor | 4/6 |
| 2c' | 15; 0 | Yes | Poor | 3/5 |
| 2d | 15; 2.2 | Yes | Moderate | 5/7 |
| 2d' | 15; 2.2 | Yes | Moderate | 5/6 |

Overall, the data in Table 2 demonstrate that the processability and performance of the post-recycled bottles are similar to or even slightly improved as compared to the processability and performance of the virgin bottles.

EXAMPLES

Example 1 (Comparative)

100% B54-25H-127 HDPE copolymer (INEOS Olefins & Polymers USA, League City, Tex.) is added to the feed hopper of a Kautex single cavity extrusion blow molder (Kautex Maschinenbau GmbH, Bonn, Germany). The extruder zones are set to temperatures of 320° F., 340° F., 360° F., and 380° F. and a general purpose screw with a pineapple kneading section is used. Boston round bottles having a volume of about 400 mL and a weight of about 30 g are produced.

Example 1a

95% B54-25H-127 HDPE copolymer and 5% of 4042D PLA pellets from NatureWorks LLC (dried per manufacturer's directions) are added to a mechanical paddle mixer. The paddle mixer is operated at 60 rpm for a period of 1 minute to achieve good macrohomogeneity. The dry mix is transferred from the paddle mixer to the hopper of the Kautex blow molder. The extruder zones are set to 320° F., 340° F., 360° F., and 380° F. and a general purpose screw with a pineapple kneading section is used. Boston round bottles of about 400 mL are produced at a target weight of about 30 g.

Example 1b 94.4% of B54-25H-127 HDPE copolymer, 5.0% of 4042D PLA (dried per manufacturer's directions), and 0.6% of BioMax® Strong 100 pellets from E. I. DuPont De Memours and Company are added to a mechanical paddle mixer, and then processed to make 400 mL Boston round bottles as described in Example 1a.

Example 1c

90% of B54-25H-127 HDPE copolymer and 10% of 4042D PLA pellets (dried per manufacturer's directions) are added to a mechanical paddle mixer, and then processed to make 400 mL Boston round bottles as described in Example 1a.

Example 1d 88.8% of B54-25H-127 HDPE copolymer, 10.0% of 4042D PLA (dried per manufacturer's directions), and 1.2% of BioMax® Strong 100 pellets are added to a mechanical paddle mixer, and then processed to make 400 mL Boston round bottles as described in Example 1a.

Example 1e

85% of B54-25H-127 HDPE copolymer and 15% of 4042D PLA pellets (dried per manufacturer's directions) are added to a mechanical paddle mixer, and then processed to make 400 mL Boston round bottles as described in Example 1a.

Example 1f 83.4% of B54-25H-127 HDPE copolymer, 15.0% of 4042D PLA (dried per manufacturer's directions), and 1.6% of BioMax® Strong 100 pellets are added to a mechanical paddle mixer, and then processed to make 400 mL Boston round bottles as described in Example 1a.

Example 1g 80.0% of B54-25H-127 HDPE copolymer and 20.0% of 4042D PLA pellets (dried per manufacturer's directions) are added to a mechanical paddle mixer, and then processed to make 400 mL Boston round bottles as described in Example 1a.

Example 1h 77.8% of B54-25H-127 HDPE copolymer, 20% of 4042D PLA (dried per manufacturer's directions), and 2.2% of BioMax® Strong 100 pellets are added to a mechanical paddle mixer, and then processed to make 400 mL Boston round bottles as described in Example 1a.

Example 2 (Comparative)

100% B54-25H-127 HDPE copolymer pellets are added to the feed hopper of a Kautex single cavity extrusion blow molder. The extruder zones are set to 320° F., 340° F., 360° F., and 380° F. and a general purpose screw with a pineapple kneading section is used. Boston round bottles of about 400 mL are produced at a target weight of about 30 g.

Example 2' (Comparative)

To simulate a recycling process, the bottles of Example 2 are granulated according to the method described above. The granules are added to the feed hopper of a Kautex single cavity extrusion blow molder, and processed to make 400 mL Boston round bottles as in Example 2.

Example 2a

90% B54-25H-127 HDPE copolymer and 10% 4042D PLA pellets (dried per manufacturer's directions) are added to a mechanical paddle mixer, and then processed to make 400 mL Boston round bottles as described in Example 2.

Example 2a'

To simulate a recycling process, the bottles of Example 2a are granulated according to the method described above. The granules are added to the feed hopper of a Kautex single cavity extrusion blow molder and processed to make 400 mL Boston round bottles as in Example 2'.

Example 2b 88.8% B54-25H-127 HDPE copolymer, 10.0% 4042D PLA pellets (dried per manufacturer's directions), and 1.2% of BioMax® Strong 100 pellets are added to a mechanical paddle mixer, and then processed to make 400 mL Boston round bottles as described in Example 2.

Example 2b'

To simulate a recycling process, the bottles of Example 2b are granulated according to the method described above. The granules are added to the feed hopper of a Kautex single cavity extrusion blow molder, and processed to make 400 mL Boston round bottles as in Example 2'.

Example 2c 85.0% B54-25H-127 HDPE copolymer and 15% of 4042D PLA pellets (dried per manufacturer's directions) are added to a mechanical paddle mixer, and then processed to make 400 mL Boston round bottles as described in Example 2.

Example 2c'

To simulate a recycling process, the bottles of Example 2c are granulated according to the method described above. The granules are added to the feed hopper of a Kautex single cavity extrusion blow molder, and processed to make 400 mL Boston round bottles as in Example 2'.

Example 2d 82.8% B54-25H-127 HDPE copolymer, 15.0% lbs of 4042D PLA (dried per manufacturer's directions), and 2.2% BioMax® Strong 100 pellets are added to a mechanical paddle mixer, and then processed to make 400 mL Boston round bottles as described in Example 2.

Example 2d'

To simulate a recycling process, the bottles of Example 2d are granulated according to the method described above. The granules are added to the feed hopper of a Kautex single cavity extrusion blow molder, and processed to make 400 mL Boston round bottles as in Example 2'.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A polymeric composition consisting of:
 (a) about 10 wt % of a polylactic acid polymer;
 (b) about 88.8 wt % of an HDPE copolymer;
 (c) about 1.2 wt % of an ethylene acrylate copolymer.
2. A polymeric composition consisting of:
 (a) about 5 wt % of a polylactic acid polymer;
 (b) about 94.4 wt % of an HDPE copolymer;
 (c) about 0.6 wt % of an ethylene acrylate copolymer.

3. A polymeric composition consisting of:
(a) about 5 wt % to about 6 wt % of a polylactic acid polymer;
(b) about 94 wt % to about 95 wt % of an HDPE copolymer;
(c) about 0.6 wt % ethylene acrylate copolymer;
wherein the ethylene acrylate copolymer is present in the polymeric composition in a weight ratio of about 0.12 with the polylactic acid polymer.

4. An article manufactured from said polymeric composition of claim 3.

5. The article of claim 3, wherein said article is a container.

* * * * *